(12) United States Patent
Heo et al.

(10) Patent No.: US 7,648,931 B2
(45) Date of Patent: Jan. 19, 2010

(54) PLASMA DISPLAY APPARATUS AND DRIVING METHOD THEREOF

(75) Inventors: Jong Heo, Pohang-si (KR); Sungho Woo, Daegu (KR); Hyunwook Kim, Pohang-si (KR); Byungjun Mun, Daegu (KR)

(73) Assignee: LG Electronics Inc., Seoul (KR)

( * ) Notice: Subject to any disclaimer, the term of this patent is extended or adjusted under 35 U.S.C. 154(b) by 628 days.

(21) Appl. No.: 11/262,761

(22) Filed: Nov. 1, 2005

(65) Prior Publication Data

US 2006/0290257 A1 Dec. 28, 2006

(30) Foreign Application Priority Data

Jun. 24, 2005 (KR) .................. 10-2005-0055320

(51) Int. Cl.
- C03C 3/064 (2006.01)
- C03C 3/062 (2006.01)
- C03C 8/24 (2006.01)
- C03C 8/14 (2006.01)
- C03C 8/20 (2006.01)
- C09K 19/00 (2006.01)

(52) U.S. Cl. ..................... 501/77; 501/73; 501/15; 501/17; 501/18; 428/1.1

(58) Field of Classification Search .................. 501/73, 501/22, 17, 77, 78, 79, 15, 18, 21
See application file for complete search history.

(56) References Cited

U.S. PATENT DOCUMENTS

| | | | |
|---|---|---|---|
| 3,588,315 A * | 6/1971 | Holcomb et al. | 174/50.64 |
| 4,521,641 A * | 6/1985 | Snell et al. | 174/50.64 |
| 6,287,995 B1 | 9/2001 | Lee | 501/15 |
| 6,495,482 B1 * | 12/2002 | de Sandro et al. | 501/50 |
| 6,599,851 B1 * | 7/2003 | Ryu | 501/22 |
| 2002/0023764 A1 | 2/2002 | Marlor et al. | 174/50.5 |

FOREIGN PATENT DOCUMENTS

| JP | 59-003044 | 1/1984 |
|---|---|---|
| JP | H59003044 A * | 1/1984 |

* cited by examiner

*Primary Examiner*—Karl E Group
*Assistant Examiner*—Noah S Wiese
(74) *Attorney, Agent, or Firm*—KED & Associates, LLP

(57) ABSTRACT

The present invention relates to a sealing glass composition that excludes Pb, i.e., an environmentally harmful material, and a flat panel display apparatus using the same. A sealing glass composition of the present invention comprises $Sb_2O_3$ of 20 mol % to 50 mol %, $B_2O_3$ of 30 mol % to 70 mol %, $SiO_2$ of 5 mol % to 15 mol % and $Al_2O_3$ of 0 mol % to 15 mol %. The flat display apparatus of the present invention has a front panel and a rear panel, which are combined together with a sealing glass composition with a predetermined distance therebetween.

10 Claims, 3 Drawing Sheets

PLASMA DISPLAY APPARATUS AND DRIVING METHOD THEREOF

This Nonprovisional application claims priority under 35 U.S.C. § 119(a) on Patent Application No. 10-2005-0055320 filed in Korea on Jun. 24, 2005, the entire contents of which are hereby incorporated by reference.

BACKGROUND OF THE INVENTION

1. Field of the Invention

The present invention relates to a sealing glass composition and a flat panel display apparatus using the same.

2. Background of the Related Art

A display device that has been widely used is a Cathode Ray Tube (CRT). The CRT, however, has problems in that the greater the display region, the heavier the weight and the greater the volume. Recently, however, a flat type display apparatus that solves the shortcomings of the CRT is part of a next-generation display industry, that is, undergoes continuous technological developments.

There has been active research, development and investment in next-generation display types such as Liquid Crystal Displays (LCD), Plasma Display Panels (PDP), Field Emission Devices (FED) and the like. In addition, an electrochromic display using electrochemical properties, a Suspended Particle Display (SPD) using distributed particles, etc. have been researched as a prospective flat type display apparatus.

In a plasma display panel, a barrier rib is formed between a front panel and a rear panel forming one unit cell. Each cell is filled with a main discharge gas such as neon (Ne), helium (He) or a mixed gas (Ne+He) of Ne and He, and an inert gas containing a small amount of xenon. If the inert gas is discharged with a high frequency voltage, it generates vacuum ultraviolet rays. Phosphors formed between the barrier ribs are emitted to display images. A plasma display panel can be manufactured to be thin, and as such, this display type is among the leading next-generation display devices.

In a PDP display apparatus, the front panel and the rear panel are combined together by a sealing material such as frit glass with a predetermined distance therebetween. The conventional sealing material includes PbO—$B_2O_3$—ZnO as its main ingredient. When the sealing process is to occur, the PbO is heated up to a sealing temperature at which the sealing material is sufficiently softened to enable the sealing of the panel. If the softening temperature of the sealing material is too high, the plasma display panel can be damaged by the excessive heat. Therefore, the PbO is used to lower the melting point of the sealing material.

If the sealing material will be adhered to the panel, it should have a thermal expansion coefficient similar to that of the panel glass used in the PDP. Accordingly, $B_2O_3$ serves to lower thermal expansion coefficient of the sealing material and is used as a glass formation agent.

After the front panel and the rear panel are sealed, a discharge gas is injected. To prevent the leakage of the discharge gas from the sealing panels, the adhesion strength of the sealing material must be adhesive and such adhesion strength is increased through improvements of the chemical durability of the sealing material. A conventional sealing glass composition includes ZnO to improve chemical durability.

PbO, a major component of a conventional sealing material composition contains the Pb component that is very injurious to the human body. If the serious adverse health events may occur, the human body is exposed to Pb component while at work. In addition, if the Pb component is discarded, the Pb component will react to an acid or alkali component in underground water and will cause environmental problems due to contamination of solid and water.

Several potential alternative components such as $Bi_2O_3$—$B_2O_3$ and $P_2O_5$—SnO have low melting points and do not contain Pb. In the $Bi_2O_3$—$B_2O_3$ material, however, $Bi_2O_3$, a main ingredient, has a low melting point, but Bi itself is a heavy metal. There are problems in using $Bi_2O_3$—$B_2O_3$ given the possible adverse effects given the increased cost incurred because Bi is a rare material.

The $P_2O_5$—SnO material is environmentally-friendly, but the $P_2O_5$ component has a very low chemical durability that caused low mechanical strength. In addition, SnO is an expensive sub-component, and is difficult for vitrification if it added a lot.

$Bi_2O_3$ and $P_2O_5$, which are substitution materials for PbO, are combined with alkali metals in order to approximate the glass transition temperature of PbO. However, the need to use such alkali metals is problematic in that they reduce the lifespan of phosphors and/or the lifespan of the panel glass.

SUMMARY OF THE INVENTION

Accordingly, the present invention has been made in view of the above problems, and it is an object of the present invention to provide a sealing glass composition that excludes Pb, i.e., a material harmful to the environment, and flat panel display apparatus using the same.

To achieve the above object, a sealing glass composition according to the present invention comprises $Sb_2O_3$ of 20 mol % to 50 mol %, $B_2O_3$ of 30 mol % to 70 mol %, $SiO_2$ of 5 mol % to 15 mol % and $Al_2O_3$ of 15 mol % and below.

A flat display apparatus according to the present invention includes a front panel and a rear panel, which are combined together with a sealing glass composition. The sealing glass composition comprises $Sb_2O_3$.

The content ratio of $Sb_2O_3$ in the entire sealing glass composition comprises 20 mol % to 50 mol %.

$B_2O_3$ and $SiO_2$ are added to $Sb_2O_3$ of the sealing glass composition.

The content ratio of $B_2O_3$ in the entire sealing glass composition can range from 30 mol % to 70 mol %.

The content ratio of $SiO_2$ in the entire sealing glass composition can range from 5 mol % to 15 mol %.

The sealing glass composition comprises 49.1 wt % to 81.4 wt % Sb2O3, 27.8 wt % to 48.7 wt % $B_2O_3$, 3.0 wt % to 9.0 wt % $SiO_2$.

The sealing glass composition comprises a ceramic filler.

The sealing glass composition in the entire sealing glass composition comprises 5 mol % to 45 mol % ceramic filler.

The ceramic filler comprises at least one of cordierite, β-eucryptite, zirconium phosphatate, zircon, mullite, willemite, β-spodumene, forsterite, anorthite, alumina, silica, $BaTiO_3$ and $Al_2TiO_3$.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
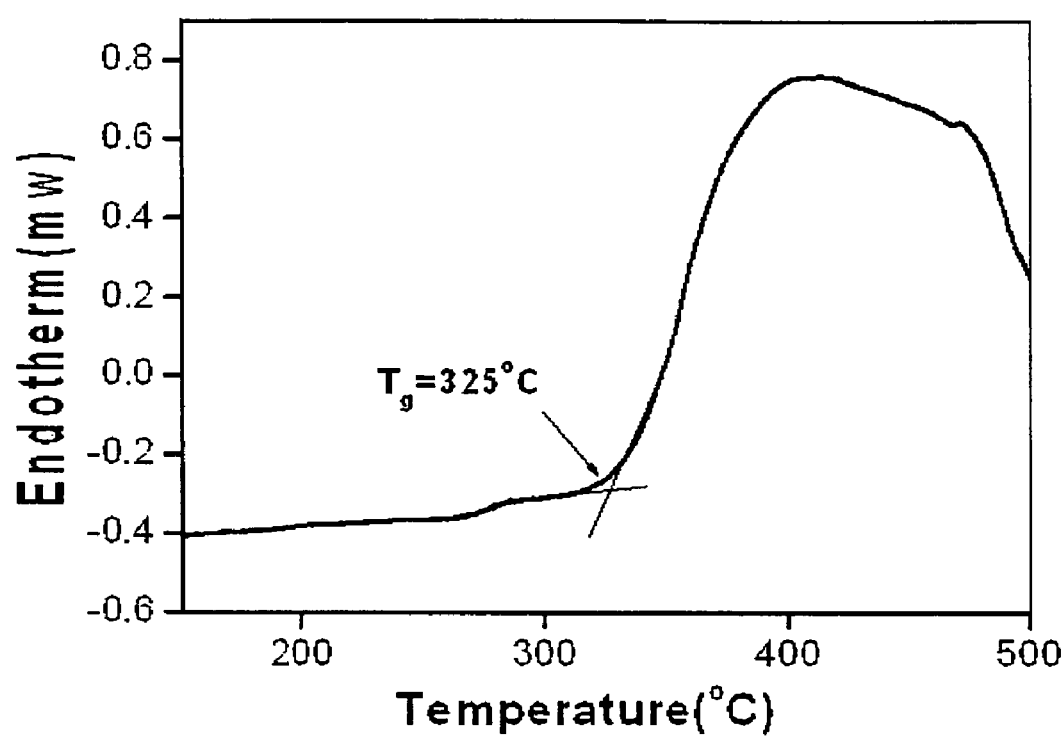
FIG. 1 is a graph showing a glass transition point (Tg) of a glass composition according to the present invention, which was measured using DCS.

A sealing glass composition and a flat panel display apparatus using the same according to the present invention will now be described in detail in connection with preferred embodiments with reference to the accompanying drawings.

Sealing glass according to the present invention uses $Sb_2O_3$ as a main ingredient instead of PbO, which is generally used for a low melting point, of a composition. $B_2O_3$ and $SiO_2$ as glass forming materials are added to $Sb_2O_3$. $Al_2O_3$ is also added to $Sb_2O_3$ so as to enhance the chemical durability of glass.

In the sealing glass comprised of such a composition, the $Sb_2O_3$ composition is indispensable because it lowers the glass transition point or the dilatometric softening temperature. The $Sb_2O_3$ content ranges from 20 mol % to 50 mol %. If the $Sb_2O_3$ content in the composition is less than 20 mol %, a problem arises because the glass transition point will become too high. If the $Sb_2O_3$ content is 50 mol % or higher, a problem arises because the $Sb_2O_3$ becomes to difficult to be vitrified.

$B_2O_3$ and $SiO_2$ as the glass forming materials, which can stabilize glass and lower the thermal expansion coefficient, are added to $Sb_2O_3$ having the content ratio. The content of $B_2O_3$ added to $Sb_2O_3$ ranges from 30 mol % to 70 mol %. If the content of $B_2O_3$ added to $Sb_2O_3$ is less than 30 mol %, a problem arises because the thermal expansion coefficient of glass increases. If the content of $B_2O_3$ added to $Sb_2O_3$ is 70 mol % or higher, a problem arises because the leakage of the glass material increases and viscosity becomes high, degrading the fluidity.

The content of $SiO_2$ added as another glass forming material ranges from 5 mol % to 15 mol %. If the content of $SiO_2$ added to $Sb_2O_3$ is less than 5 mol %, a problem arises because the possibility of lowering the thermal expansion coefficient is low. If the content of $SiO_2$ added to $Sb_2O_3$ is 15 mol % or higher, a problem arises because the glass transition point rises and the fluidity of the glass upon sintering is significantly degraded. The reason why the content of $SiO_2$ is lower than that of $B_2O_3$ as the glass forming material is because $SiO_2$ has a greater effect on raising the glass transition point than $B_2O_3$ has.

If the content ratio of $B_2O_3$ becomes too high, the thermal expansion coefficient will be lowered, but the chemical durability will be weakened. To alleviate such a shortcoming, $Al_2O_3$ is added.

The content of $Al_2O_3$ added is 15 mol % or less. If the content of $Al_2O_3$ added is 15 mol % or higher, problems arise because the glass transition point will be increased, the fluidity will be degraded and the $Al_2O_3$ will not be fully melted upon sintering.

The content ratio of this sealing glass composition is not restricted to mol %, but can be expressed as wt %. This will be described below.

To attain a low melting point, the $Sb_2O_3$ content is from 49.1 wt % to 81.4 wt %. $B_2O_3$ and $SiO_2$, which are the glass forming materials for stabilizing glass and lowering the thermal expansion coefficient, can be from 27.8 wt % to 48.7 wt % and from 3.0 wt % to 9.0 wt %, respectively. $Al_2O_3$ for supplementing the shortcoming that the durability weakens can be from 0 wt % to 15.3 wt %.

The sealing glass comprised of the composition described above can be used as sealing glass of not only a plasma display apparatus, but also of a variety of other flat display apparatuses.

Where the sealing glass is used as the sealing material for the plasma display apparatus, however, the thermal expansion coefficient of the sealing glass composition will be higher than the thermal expansion coefficient of the plasma display apparatus. This display may lead to the deformation of a panel in a plasma display apparatus. Accordingly, to lower the thermal expansion coefficient of the sealing glass, a ceramic filler is added to the sealing glass composition. This ceramic filler may comprise at least one of cordierite, β-eucryptite, zirconium phosphatate, zircon, mullite, willemite, β-spodumene, forsterite, anorthite, alumina, silica, $BaTiO_3$ and $Al_2TiO_3$.

The content ratio of the ceramic filler is from 5 mol % to 45 mol %. If the content of a ceramic filler added is less than 5 mol %, the possibility of lowering the thermal expansion coefficient is low. If the content of a ceramic filler added is 45 mol % or higher, a problem arises because the fluidity of a sealing material is degraded and the adhesion of the plasma display apparatus is bad.

To facilitate the understanding of the present invention, a first comparison example, a first embodiment and a second embodiment according to the present invention will be described below with reference to Tables below.

FIRST COMPARISON EXAMPLE

To measure the glass transition point of a mixture of $Sb_2O_3$, $B_2O_3$ and $SiO_2$ before fabricating the sealing glass according to the present invention, the $Sb_2O_3$, $B_2O_3$ and $SiO_2$ were well mixed according to respective content ratios, as shown in Table 1. The mixture was then placed in a platinum furnace and melted at a temperature of 1000° C. to 1300° C. for about 30 minutes to 1 hour. The melted material was rapidly cooled using a roller and then underwent a ball meal process. Glass powder of 100 μm or less was obtained from the material using a sieve. A glass transition point of each composition in the glass powder was measured using Differential Scanning Calorimetry (DSC) and the measurement result is shown in Table 2.

TABLE 1

|  | Component | | |
| --- | --- | --- | --- |
| Composition | $Sb_2O_3$ | $SiO_2$ | $B_2O_3$ |
| Composition 1 | 40 mol % | 10 mol % | 50 mol % |
| Composition 2 | 35 mol % | 10 mol % | 55 mol % |
| Composition 3 | 30 mol % | 10 mol % | 60 mol % |
| Composition 4 | 25 mol % | 10 mol % | 65 mol % |

$Sb_2O_3$ of 40 mol %, $SiO_2$ of 10 mol % and $B_2O_3$ of 50 mol % were well mixed according to composition 1 of Table 1. A glass transition point of glass powder obtained in the same method as that described above was measured. The measured glass transition point is 298° C. as shown in Table 2.

$Sb_2O_3$ of 35 mol %, $SiO_2$ of 10 mol % and $B_2O_3$ of 55 mol % were well mixed according to composition 2 of Table 1. A glass transition point of glass powder obtained in the same method as that described above was measured. The measured glass transition point is 292° C. as shown in Table 2.

$Sb_2O_3$ of 30 mol %, $SiO_2$ of 10 mol % and $B_2O_3$ of 60 mol % were well mixed according to composition 3 of Table 1. A glass transition point of glass powder obtained in the same method as that described above was measured. The measured glass transition point is 286° C. as shown in Table 2.

$Sb_2O_3$ of 25 mol %, $SiO_2$ of 10 mol % and $B_2O_3$ of 65 mol % were well mixed according to composition 4 of Table 1. A glass transition point of glass powder obtained in the same method as that described above was measured. The measured glass transition point is 275° C. as shown in Table 2.

TABLE 2

|  | Glass Transition Point (Tg) |
| --- | --- |
| Composition 1 | 298° C. |
| Composition 2 | 292° C. |
| Composition 3 | 286° C. |
| Composition 4 | 275° C. |

From the above, it can be seen that the glass transition point shown in the first comparison example is lower when compared to the 310° C. to 320° C. glass transition point of a conventional softener that is generally used. In the first comparison example, however, since significant $B_2O_3$ was added, the chemical durability (water-resisting qualities, acid-resisting qualities, alkali-resisting qualities, etc.) of the composition is weak. Therefore, to overcome these disadvantages, $Al_2O_3$ is added to the sealing glass according to the present invention.

FIRST EMBODIMENT

To measure a glass transition point of sealing glass according to the present invention, in the same manner as the first comparison example, $Sb_2O_3$, $B_2O_3$, $SiO_2$ and $Al_2O_3$ (i.e., a sealing glass composition) were well mixed according to their respective content ratios, as shown in Table 3. The mixture was then placed at a platinum furnace and melted at a temperature of 1000° C. to 1300° C. for about 30 minutes to 1 hour. The melted material was rapidly cooled using a roller and then underwent a ball meal process. Glass powder of 100 μm or less was obtained from the material using a sieve. A glass transition point of each composition in the glass powder was measured using Differential Scanning Calorimetry (DSC) and the measurement result is shown in Table 4.

TABLE 3

| Composition | Component | | | |
| --- | --- | --- | --- | --- |
|  | $Sb_2O_3$ | $SiO_2$ | $B_2O_3$ | $Al_2O_3$ |
| Composition 5 | 40 mol % | 10 mol % | 40 mol % | 10 mol % |
| Composition 6 | 30 mol % | 10 mol % | 50 mol % | 10 mol % |
| Composition 7 | 20 mol % | 10 mol % | 60 mol % | 10 mol % |

$Sb_2O_3$ of 40 mol %, $SiO_2$ of 10 mol %, $B_2O_3$ of 40 mol % and $Al_2O_3$ of 10 mol % were well mixed according to composition 5 of Table 3. A glass transition point of the glass powder obtained in the same method as that described above was measured. The measured glass transition point is 340° C. as shown in Table 4.

$Sb_2O_3$ of 30 mol %, $SiO_2$ of 10 mol %, $B_2O_3$ of 50 mol % and $Al_2O_3$ of 10 mol % were well mixed according to composition 6 of Table 3. A glass transition point of the glass powder obtained in the same method as that described above was measured. The measured glass transition point is 325° C. as shown in Table 4.

To clarify the resulting values, a DCS graph for composition 6 is shown in FIG. 1 as an example.

FIG. 1 is a graph showing a glass transition point (Tg) of the glass composition of composition 6 according to the present invention, which was measured using DCS.

As shown in FIG. 1, the glass transition point of the glass composition of composition 6 is 325° C.

$Sb_2O_3$ of 20 mol %, $SiO_2$ of 10 mol %, $B_2O_3$ of 60 mol % and $Al_2O_3$ of 10 mol % were well mixed according to composition 7 of Table 3. A glass transition point of the glass powder obtained in the same method as that described above was measured. The measured glass transition point is 310° C. as shown in Table 4.

TABLE 4

|  | Glass Transition Point (Tg) |
| --- | --- |
| Composition 5 | 340° C. |
| Composition 6 | 325° C. |
| Composition 7 | 310° C. |

In this embodiment 1, it can be seen that composition 6 has the glass transition point similar to the temperature of a conventional softener that is generally used. Accordingly, the glass powder obtained in composition 6 is formed to have a rectangle of 2 mm×2 mm×10 mm in size. The thermal expansion coefficient and the dilatometric softening temperature of the glass powder were measured through TMA.

A sample of the glass powder obtained in composition 6, which had a volume corresponding to 1 $cm^3$, was dipped into distilled water for 1 hour. The weight reduction ratio (%) of the glass composition was measured.

TABLE 5

| Dilatometric Softening Temperature ($T_{dsp}$) | 412° C. |
| --- | --- |
| Thermal expansion coefficient (/° C.) | $112.35 \times 10^{-7}$/° C. |
| Water-resisting qualities (wt %) | 0.4 wt % to 0.5 wt % |

As shown in Table 5, the dilatometric softening temperature ($T_{dsp}$) of the glass powder obtained in composition 6 was measured as 412° C., the thermal expansion coefficient (/° C.) of the glass powder obtained in composition 6 was measured as $112.35 \times 10^{-7}$/° C., and the water-resisting qualities (wt %) of the glass powder obtained in composition 6 was measured as 0.4 wt % to 0.5 wt %.

Figure 2:
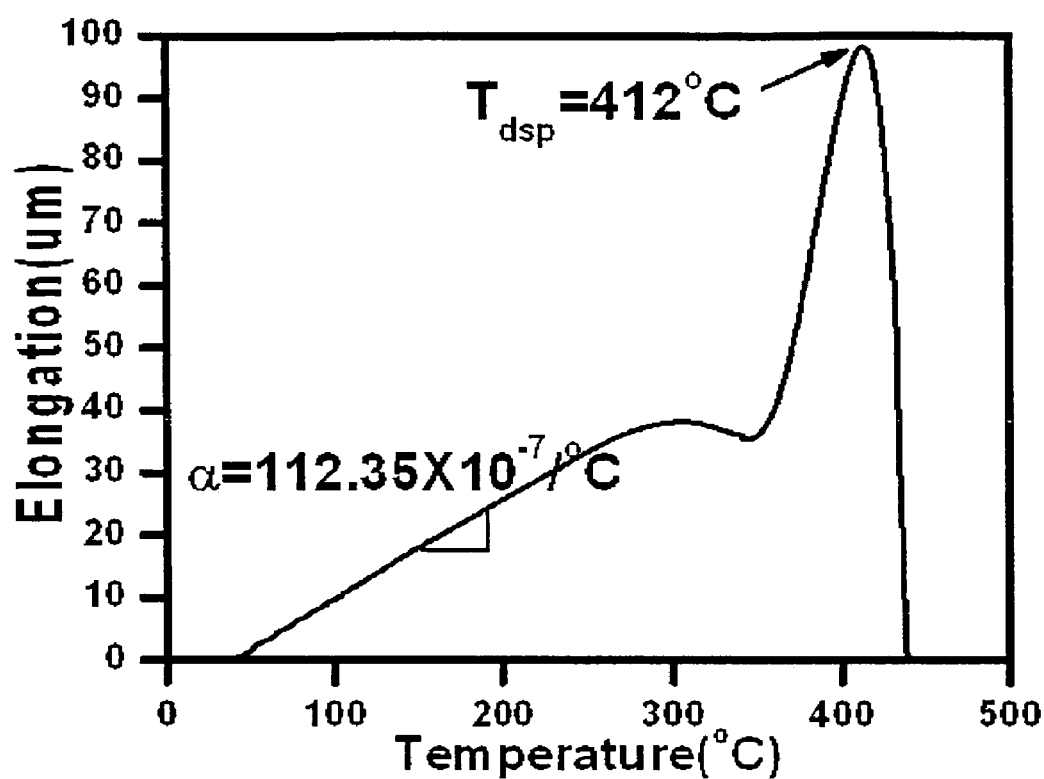
FIG. 2 is a graph showing a dilatometric softening temperature (Tdsp) and the thermal expansion coefficient (α) of a glass composition according to the present invention, which were measured using Thermomechanical Analysis (TMA)

To clarify the resulting values, a TMA graph for composition 6 is shown in FIG. 2 as an example.

FIG. 2 is a graph showing the dilatometric softening temperature (Tdsp) and the thermal expansion coefficient (α) of a glass composition according to the present invention, which were measured using TMA.

As shown in FIG. 2, the dilatometric softening temperature (Tdsp) of the glass composition of composition 6 is 412° C., and the thermal expansion coefficient (α) of the glass composition of composition 6 is $112.35 \times 10^{-7}$/° C.

As described above, the sealing glass fabricated using $Sb_2O_3$ as a main ingredient without using PbO has the glass transition point of about 320° C. to 330° C. and the dilatometric softening temperature of about 400° C. to 410° C. These temperature ranges are similar to those of the conventional material. Accordingly, the sealing glass of the present invention can be suitably used as glass for sealing a variety of flat display apparatuses.

SECOND EMBODIMENT

Sealing glass of a common plasma display apparatus must have water-resisting qualities of 1.5 wt %. However, water-resisting qualities of the glass powder obtained according to composition 6 of the first embodiment is 1.5 wt % or less. Thus, it can fulfill the condition as the use for a plasma display apparatus. However, since the thermal expansion coefficient of the glass powder is higher than $70 \times 10^{-7}/°$ C. to $90 \times 10^{-7}/°$ C., which is the thermal expansion coefficient needed in a sealing material for use in a plasma display apparatus, it may cause deformation in the plasma display panel. Accordingly, to use the glass powder as the sealing material for the plasma display apparatus, a ceramic filler is added to lower the thermal expansion coefficient and enhance the mechanical strength.

As shown in Table 6, after the sealing glass and the ceramic filler were mixed, they were placed in a mold and then shaped. The mixture was then sintered at a temperature of 450° C. for 1 hour and then formed to have a rectangle of 2 mm×2 mm×10 mm in size. The thermal expansion coefficient of the mixture was measured through TMA. In this example, cordierite was used as the ceramic filler

TABLE 6

|  | Glass Content (wt %) | Filler Content (wt %) | Coefficient of thermal expansion (/° C.) |
| --- | --- | --- | --- |
| Composition 8 | 80 | 20 | $90 \times 10^{-7}/°$ C. |
| Composition 9 | 77 | 23 | $85 \times 10^{-7}/°$ C. |
| Composition 10 | 75 | 25 | $68 \times 10^{-7}/°$ C. |
| Composition 11 | 70 | 30 | $62 \times 10^{-7}/°$ C. |
| Composition 12 | 60 | 40 | $54 \times 10^{-7}/°$ C. |

Figure 3:
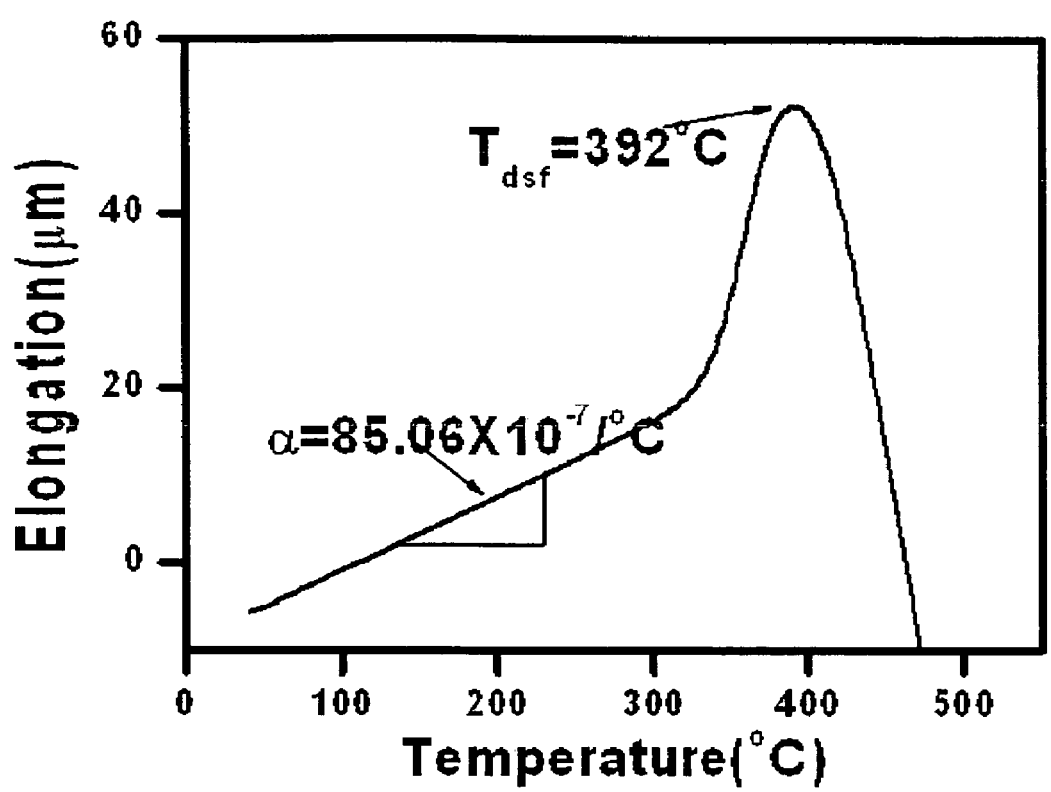
FIG. 3 is a graph showing a dilatometric softening temperature (Tdsp) and the thermal expansion coefficient (α) of a composition in which a ceramic filler is contained in the glass composition according to the present invention, which were measured using TMA.

To clarify the resulting values, a TMA graph for composition 8 is shown in FIG. 3 as an example.

FIG. 3 is a graph showing a dilatometric softening temperature (Tdsp) and the thermal expansion coefficient ($\alpha$) of a composition in which a ceramic filler is contained in the glass composition according to the present invention, which were measured using TMA.

As shown in FIG. 3, the dilatometric softening temperature (Tdsp) of the glass composition of composition 8 is 392° C., and the thermal expansion coefficient ($\alpha$) of the glass composition of composition 8 is $85.06 \times 10^{-7}/°$ C. This shows that the thermal expansion coefficient is further low compared to when the ceramic filler is mixed.

From Table 6, the thermal expansion coefficient of composition 9 meets $70 \times 10^{-7}/°$ C. to $90 \times 10^{-7}/°$ C., which is the thermal expansion coefficient required for a sealing material for use in a plasma display apparatus, by mixing the sealing glass with the ceramic filler.

The mechanical strength can also be increased through the addition of the ceramic filler. As described above, the ceramic filler can be used not only in the plasma display apparatus, but also in a variety of flat display apparatuses whose thermal expansion coefficient is not suitable for sealing glass.

In the glass composition of $Sb_2O_3$ 20 mol %, $SiO_2$ 10 mol %, $B_2O_3$ 60 mol %, $Al_2O_3$ 10 mol % according to composition 6, in the case of composition 9 where composition 6 is set to 77 wt % and the content of a ceramic filler of 23 wt % is mixed with the composition, there is a trend that high-temperature viscosity behavior is slightly high. Thus, a TMA experiment was performed on composition 3 of $Sb_2O_3$ 30 mol %, $SiO_2$ 10 mol %, $B_2O_3$ 60 mol % in which $Al_2O_3$ is subtracted from composition 6. As a result, since the thermal expansion coefficient was high, cordierite 25 wt % (i.e., a ceramic filler) was added. A TMA experiment was performed again. The experiment result is shown in Table 7.

TABLE 7

|  | Transition point (Tg) | Dilatometric softening temperature (Tdsp) | Thermal expansion coefficient (/° C.) |
| --- | --- | --- | --- |
| Composition 3 | 297° C. | 334° C. | $130 \times 10^{-7}/°$ C. |
| Composition 7 (75 wt %) + filler (25 wt %) | 303° C. | 356° C. | $84 \times 10^{-7}/°$ C. |

As shown in Table 7, in the case of a composition containing $Al_2O_3$, the dilatometric softening temperature is further lowered. As a result, the viscosity behavior is improved.

As described above, sealing glass is fabricated using $Sb_2O_3$ not PbO as a main ingredient. The sealing glass is thus environmental-friendly and does not contain alkali metals. As a result, adverse effects on phosphors or a panel can be avoided.

As described above, a plasma display panel according to the present invention includes a front panel and a rear panel, which are combined together with a sealing glass composition with a predetermined distance therebetween. The sealing glass composition comprises $Sb_2O_3$.

The sealing glass composition is environmentally-friendly since it excludes PbO. As a result, adverse effects on phosphors or a panel can be avoided and a good chemical durability can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sealing glass composition comprising $Sb_2O_3$ of 23 mol % to 50 mol %, $B_2O_3$ of 30 mol % to 70 mol %, $SiO_2$ of 5 mol % and $Al_2O_3$ of greater than 0% to 15 mol %.

2. A sealing glass composition comprising $Sb_2O_3$ of 49.1 wt % to 81.4 wt %, $B_2O_3$ of 27.8 wt % to 48.7 wt %, $SiO_2$ of 3.0 wt % to 9.0 wt % and $Al_2O_3$ of 15.3 wt % and below.

3. The sealing glass composition as claimed in claim 1, further comprising 5 mol % to 45 mol % of a ceramic filler.

4. The sealing glass composition as claimed in claim 3, wherein the ceramic filler comprises at least one of cordierite, β-eucryptite, zirconium phosphatate, zircon, mullite, willemite, β-spodumene, forsterite, anorthite, alumina, silica, $BaTiO_3$ or $Al_2TiO_3$.

5. A flat display apparatus in which a front panel and a rear panel are combined together with a sealing glass composition, wherein the sealing glass composition comprises $Sb_2O_3$ of 23 mol % to 50 mol %, $B_2O_3$ of 30 mol % to 70 mol %, $SiO_2$ of 5 mol % to 15 mol % and $Al_2O_3$ of greater than 0% to 15 mol %.

6. A flat display apparatus in which a front panel and a rear panel are combined together with a sealing glass composition, wherein the sealing glass composition comprises 49.1 wt % to 81.4 wt % of $Sb_2O_3$, 27.8 wt % to 48.7 wt % of $B_2O_3$, and 3.0 wt % to 9.0 wt % of $SiO_2$.

7. The flat display apparatus as claimed in claim 5, wherein the sealing glass composition further comprises a ceramic filler.

8. The flat display apparatus as claimed in claim 7, wherein the sealing glass composition comprises 5 mol % to 45 mol % of the ceramic filler.

9. The flat display apparatus as claimed in claim 8, wherein the ceramic filler comprises at least one of cordierite, β-eucryptite, zirconium phosphatate, zircon, mullite, willemite, β-spodumene, forsterite, anorthite, alumina, silica, $BaTiO_3$ or $Al_2TiO_3$.

10. The sealing glass composition as claimed in claim 1, wherein the sealing glass composition is provided in a plasma display panel having a front panel combined with a rear panel with the sealing glass composition.

* * * * *